United States Patent
Shao et al.

(10) Patent No.: US 8,767,631 B2
(45) Date of Patent: Jul. 1, 2014

(54) METHOD AND SYSTEM FOR ALTERNATE WIRELESS CHANNEL SELECTION FOR UPLINK AND DOWNLINK DATA COMMUNICATION

(75) Inventors: Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1044 days.

(21) Appl. No.: 11/903,783

(22) Filed: Sep. 25, 2007

(65) Prior Publication Data
US 2009/0080366 A1    Mar. 26, 2009

(51) Int. Cl.
*H04W 4/00* (2009.01)
*H04B 7/26* (2006.01)
*H04B 7/155* (2006.01)

(52) U.S. Cl.
CPC .......... *H04B 7/15542* (2013.01); *H04B 7/2606* (2013.01)
USPC ............ 370/329; 370/332; 370/341; 370/401

(58) Field of Classification Search
None
See application file for complete search history.

(56) References Cited

U.S. PATENT DOCUMENTS

| | | | |
|---|---|---|---|
| 5,999,127 A | 12/1999 | Dezelan | |
| 6,526,036 B1 | 2/2003 | Uchida et al. | |
| 6,865,609 B1 | 3/2005 | Gubbi et al. | |
| 6,934,752 B1 | 8/2005 | Gubbi | |
| 6,961,316 B2 | 11/2005 | Yamaguchi et al. | |
| 7,221,680 B2 | 5/2007 | Vijayan et al. | |
| 7,450,610 B2 | 11/2008 | An | |
| 7,499,462 B2 | 3/2009 | MacMullan et al. | |
| 7,508,781 B2 | 3/2009 | Liu et al. | |
| 7,564,862 B2 * | 7/2009 | Srikrishna et al. ............ | 370/431 |
| 7,570,627 B2 | 8/2009 | Welborn et al. | |
| 7,653,030 B2 | 1/2010 | Arrakoski et al. | |
| 7,920,540 B2 | 4/2011 | Singh et al. | |
| 7,936,782 B2 | 5/2011 | Qin et al. | |
| 8,031,666 B2 | 10/2011 | Jeon et al. | |

(Continued)

FOREIGN PATENT DOCUMENTS

| | | |
|---|---|---|
| EP | 1478135 A1 | 11/2004 |
| EP | 1484867 A2 | 12/2004 |

(Continued)

OTHER PUBLICATIONS

IEEE Computer Society, "Part 15.3: Wireless Medium Access Control (MAC) and Physical Layer (PHY) Specifications for High Rate Wireless Personal Area Networks (WPANs)," IEEE, Sep. 29, 2003, pp. 1-315, New York, United States.*

(Continued)

*Primary Examiner* — Andrew Chriss
*Assistant Examiner* — Salvador E Rivas
(74) *Attorney, Agent, or Firm* — Kenneth L. Sherman, Esq.; Michael Zarrabian, Esq.; Sherman & Zarrabian LLP

(57) ABSTRACT

A method and system for alternate wireless channel selection for uplink and downlink data communication, is provided. In a wireless communication network including a wireless relay node, a communication path is established via the relay node for transmission of the data. A wireless channel is selected as an uplink channel for uplink transmission of the data to the relay node, and an alternate wireless channel is selected as a downlink channel for downlink transmission of the data from the relay node.

51 Claims, 6 Drawing Sheets

(56) References Cited

U.S. PATENT DOCUMENTS

| | | | |
|---|---|---|---|
| 2002/0114295 A1* | 8/2002 | Takahiro et al. | 370/329 |
| 2004/0029591 A1 | 2/2004 | Chapman et al. | |
| 2004/0072573 A1 | 4/2004 | Shvodian | |
| 2004/0139477 A1* | 7/2004 | Russell et al. | 725/126 |
| 2005/0053015 A1 | 3/2005 | Jin et al. | |
| 2005/0141451 A1 | 6/2005 | Yoon et al. | |
| 2005/0152394 A1 | 7/2005 | Cho | |
| 2005/0188073 A1* | 8/2005 | Nakamichi et al. | 709/223 |
| 2006/0009229 A1 | 1/2006 | Yuan et al. | |
| 2006/0013171 A1* | 1/2006 | Ahuja et al. | 370/338 |
| 2006/0056316 A1 | 3/2006 | Chandra et al. | |
| 2006/0120324 A1* | 6/2006 | Cho et al. | 370/329 |
| 2006/0164969 A1 | 7/2006 | Malik et al. | |
| 2006/0209892 A1* | 9/2006 | MacMullan et al. | 370/468 |
| 2007/0140273 A1* | 6/2007 | Kubota | 370/401 |
| 2007/0230338 A1 | 10/2007 | Shao et al. | |
| 2007/0253388 A1* | 11/2007 | Pietraski | 370/338 |
| 2007/0253391 A1 | 11/2007 | Shao et al. | |
| 2008/0019305 A1* | 1/2008 | Dekorsy et al. | 370/329 |
| 2009/0232103 A1 | 9/2009 | Kesselman et al. | |
| 2010/0226343 A1 | 9/2010 | Hsu et al. | |

FOREIGN PATENT DOCUMENTS

| | | | |
|---|---|---|---|
| JP | 2000236338 A | 8/2000 | |
| JP | 2003274446 A | 9/2003 | |
| JP | 2004128654 A | 4/2004 | |
| JP | 2005027298 A | 1/2005 | |
| JP | 2007019604 A | 1/2007 | |
| JP | 2008512040 | 4/2008 | |
| WO | 2005089358 A2 | 9/2005 | |
| WO | 2006025773 A1 | 3/2006 | |
| WO | 2007111474 A1 | 10/2007 | |

OTHER PUBLICATIONS

IEEE P802.11e/D13.0 (Jan. 2005), "Amendment: Medium Access Control (MAC) Quality of Service (QoS) Enhancements," pp. 1-198.

IEEE Wireless LAN Edition (2003), "A compilation based on IEEE Std 802.11TM-1999 (R2003) and its amendments," Sep. 19, 2003, pp. 1-706.

Stephens, A; and Coffey, S., "Joint Proposal: High throughput extension to the 802.11 Standard: MAC," doc.: IEEE 802.11-05/1095r2, Nov. 16, 2005, pp. 1-37.

U.S. Non-final Office Action for U.S. Appl. No. 11/787,576 mailed Apr. 29, 2010.

Japanese Office Action dated May 8, 2012 for Japanese Patent Application No. 2009-502674 from Japanese Patent Office, pp. 1-2, Tokyo, Japan.

U.S. Notice of Allowance for U.S. Appl. No. 11/787,576 mailed Aug. 2, 2012.

Hitachi, Ltd. et al., "High-Definition Multimedia Interface Specification Version 1.2," HDMI Licensing, LLC, Aug. 22, 2005, pp. i-110 and CEC-i-CEC-84, United States.

IEEE Computer Society, "IEEE Std 802.15.3TM-2003 IEEE Standard for Information Technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs)," IEEE, Sep. 29, 2003, pp. i-315, New York, United States.

Van Veen, B.D. et al., "Beamforming: A Versatile Approach to Spatial Filtering," IEEE ASSP Magazine, vol. 5, No. 2, IEEE, Apr. 1988, pp. 4-24, New York, United States.

Zhu, H. et al., "A Power-Aware and QoS-Aware Service Model on Wireless Networks," 23rd Annual Joint Conference of the IEEE Computer and Communication Societies (INFOCOM 2004), vol. 2, IEEE, Mar. 2004, pp. 1393-1403, United States.

Chinese Notice of Allowance dated Feb. 25, 2011 for Chinese Patent Application 200780008339.4 from the China Intellectual Property Office, pp. 1-2, China Intellectual Property Office, People's Republic of China (English Translation attached, pp. 1-2).

Chinese Office Action dated Aug. 30, 2010 for Chinese Patent Application 200780008339.4 from the China Intellectual Property Office, pp. 1-3, China Intellectual Property Office, People's Republic of China (A machine-generated English Translation attach, pp. 1-6).

U.S. Non-final Office Action for U.S. Appl. No. 11/726,779 mailed Oct. 20, 2010.

U.S. Non-final Office Action for U.S. Appl. No. 11/726,779 mailed Mar. 30, 2011.

U.S. Final Office Action for U.S. Appl. No. 11/726,779 mailed Oct. 11, 2011.

U.S. Notice of Allowance for U.S. Appl. No. 11/726,779 mailed Jan. 20, 2012.

U.S. Final Office Action for U.S. Appl. No. 11/787,576 mailed Sep. 13, 2010.

European Search Report dated Feb. 27, 2012 for European Application No. EP 07746593, pp. 1-7, European Patent Office, Munich, Germany.

Kim, J.E. et al., "An Improvement of Channel Efficiency for IEEE 802.15.3 High Rate WPAN", Proceedings of the 2006 International Conference on Advanced Communication Technology (ICACT), Feb. 20, 2006, pp. 1677-1680, vol. 3, IEEE, United States.

Rangnekar, A. et al., "QoS Aware Multi-Channel Scheduling for IEEE 802.15.3 Networks", Feb. 1, 2006, pp. 47-62, vol. 11, No. 1, Kluwer Academic, United States.

Gilb, J.P.K. et al., "Proposal for Wireless support of uncompressed HD audio and video using 60 GHz unlicensed band", Project: IEEE P802.15 Working Group for Wireless Personal Area Networks (WPANs), Mar. 13, 2007, pp. 1-15, IEEE, United States.

Chinese Office Action dated Dec. 31, 2011, for Chinese Patent Application 200780052615.7 from China Intellectual Property Office, pp. 1-24, China Intellectual Property Office, People's Republic of China (Machine-generated English-language translation attached, pp. 1-10).

European Search Report dated Mar. 12, 2012 for European Patent Application No. 07746593.8 from European Patent Office, pp. 1-6, Munich, Germany.

Japanese Office Action dated Mar. 29, 2012 for Japanese Patent Application No. 2010-503951 from Japanese Patent Office, pp. 1-9, Tokyo, Japan (English-language translation attached, pp. 1-5).

Chinese Office Action dated Sep. 29, 2012 for Chinese Patent Application No. 200780052615.7 from Chinese Patent Office, pp. 1-35, China Intellectual Property Office, People's Republic of China (English-language translation attached, pp. 1-21).

Chinese Office Action dated Mar. 1, 2013 for Chinese Patent Application 200780052615.7 from China Intellectual Property Office, pp. 1-39, China Intellectual Property Office, People's Republic of China (Machine-generated English-language translation attached, pp. 1-25).

European Search Report dated Dec. 13, 2012 for European Application No. EP 07745674.7, pp. 1-8, European Patent Office, Munich, Germany.

Korean Office Action dated Sep. 2, 2013 for Korean Patent Application No. 10-2008-7007687 from Korean Intellectual Property Office, pp. 1-15, Seo-gu, Daejeon, Republic of Korea (Machine-generated English-language translation attached, pp. 1-10).

* cited by examiner

US 8,767,631 B2

METHOD AND SYSTEM FOR ALTERNATE WIRELESS CHANNEL SELECTION FOR UPLINK AND DOWNLINK DATA COMMUNICATION

FIELD OF THE INVENTION

The present invention relates to wireless communication, and in particular to channel selection for uplink and downlink data transmission.

BACKGROUND OF THE INVENTION

The OSI standard provides a seven-layered hierarchy between an end user and a physical device through which different systems can communicate. Each layer is responsible for different tasks, and the OSI standard specifies the interaction between layers, as well as between devices complying with the standard. The OSI standard includes a physical layer, a data link layer, a network layer, a transport layer, a session layer, a presentation layer and an application layer. The IEEE 802 standard provides a three-layered architecture for local networks that approximate the physical layer, and the data link layer of the OSI standard. The three-layered architecture in the IEEE 802 standard 200 includes a physical (PHY) layer, a media access control (MAC) layer and a logical link control (LLC) layer. The PHY layer operates as that in the OSI standard. The MAC and LLC layers share the functions of the data link layer in the OSI standard. The LLC layer places data into frames that can be communicated at the PHY layer, and the MAC layer manages communication over the data link, sending data frames and receiving acknowledgement (ACK) frames. Together the MAC and LLC layers are responsible for error checking, as well as retransmission of frames that are not received and acknowledged.

The IEEE 802.11e standard (IEEE P802.11e/D13.0 (January 2005), "Amendment: Medium Access Control (MAC) Quality of Service (QoS) Enhancements"), specifies a contention-free medium access control scheme for applications with strict delay requirements. Such a medium access control scheme is a type of time reservation scheme in which an access point (AP) allocates time periods for channel access by different stations (STAs) during a contention-free period. However, currently few manufacturers can support contention-free access control schemes in wireless devices due to implementation complexity. Most IEEE 802.11 wireless local area network (WLAN) devices can only support a contention-based medium access control scheme.

With the proliferation of high quality audio/video (A/V), an increasing number of electronics devices (e.g., consumer electronics devices) utilize high A/V information such as high definition (HD) A/V information. Conventional WLAN IEEE 802.11a/b/g and pre-N wireless devices cannot meet the real-time bandwidth requirements for such high quality A/V transmissions without delay and packet loss. For example, a HD television signal (HDTV) stream of 14 megabits per second (Mbps) over the IEEE 802.11a/g devices with 54 Mbps capacity and over pre-N devices with 108 Mbps, cannot be transmitted from a sender (i.e., source STA) to a receiver (i.e., destination STA) over a wireless channel and played back smoothly. One reason is that for the same application, uplink packets from the sender to the AP, and downlink packets from the AP to the destination, contend the wireless channel simultaneously. This increases packet collisions which causes longer delays, degrading throughout. If acknowledgement packets from the destination to the source are utilized, throughput performance is further degraded. The IEEE 802.11e standard allows a direct link (direct communication) between two STAs without an AP. However, if the two STAs are far apart (i.e., hidden nodes), proper communication between them may not be possible, or the PHY rate capacity of the direct link may be too low to support real-time requirements of HDTV transmissions.

BRIEF SUMMARY OF THE INVENTION

The present invention provides a method and system for alternate wireless channel selection for uplink and downlink data communication. In one embodiment, wireless communication for transmission of data in a network including a relay node comprises establishing a communication path via the relay node for communication of the data to the relay node and from the relay node; selecting a wireless channel as an uplink channel for uplink transmission of the data to the relay node; and selecting an alternate wireless channel as a downlink channel for downlink transmission of the data from the relay node.

In one implementation, when the network includes plural relay nodes, establishing a communication path further includes establishing a communication path via the multiple relay nodes; and for each relay node in the communication path, selecting a downlink channel for downlink transmission of the data from that relay node comprises selecting a channel as a downlink channel that is alternate to an uplink channel for transmission of the data to that relay node.

An alternate channel selection scheme according to the present invention avoids contention for the same channel between uplink and downlink transmissions of the same data communication application. One application involves wireless transmission of audio/video information such as high definition digital video information.

These and other features, aspects and advantages of the present invention will become understood with reference to the following description, appended claims and accompanying figures.

DETAILED DESCRIPTION OF THE INVENTION

The present invention provides a method and system for alternate wireless channel selection for uplink and downlink data communication. In one embodiment, according to the alternate channel selection scheme, two different channels are selected at a relay node, one channel for uplink transmission from a source station (sender) to the relay node, and another channel for downlink transmissions from the relay node to a destination/sink station (receiver). Such an alternate channel selection scheme avoids contention for the same channel between uplink and downlink transmissions of the same data communication application.

Each relay node implements the alternate channel selection scheme and accordingly selects different, independent, channels for uplink and downlink transmissions of the same application which may require transfer of large amounts of data from a source to a destination in a network.

One application of the alternate channel selection scheme is in real-time transmissions such as A/V streaming in a wireless network. This allows satisfaction of real-time communication requirements such as Quality of Service (QoS) requirements in data rate A/V applications (e.g., a HDTV stream).

In many wireless communication systems, a frame structure is used for data transmission between wireless stations such as a transmitter (sender) and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such a source addresses (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

Figure 1:
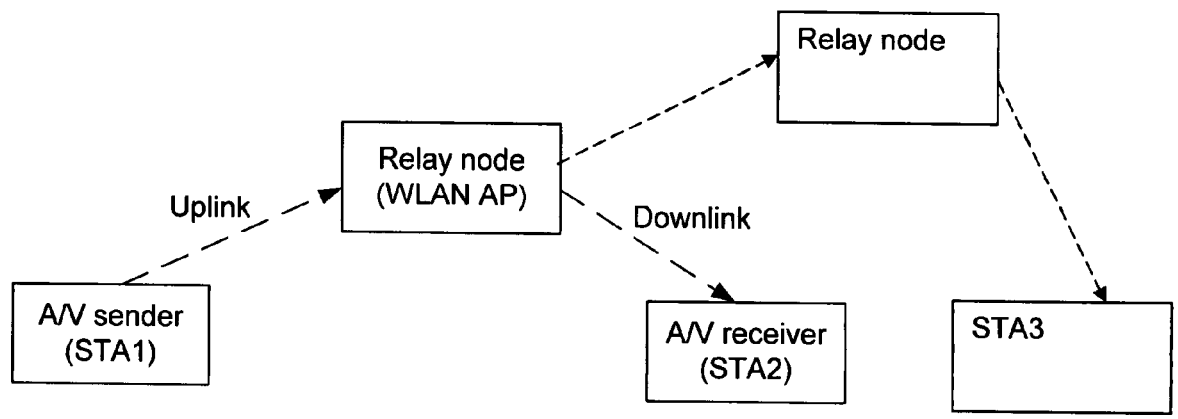
FIG. 1 shows an example topology for a wireless network, according to an embodiment of the present invention.

FIG. 1 shows a typical topology 10 for a wireless network including a sender STA1, a receiver STA2, a STA3 and two relay nodes each implemented as an AP.

Figure 2:
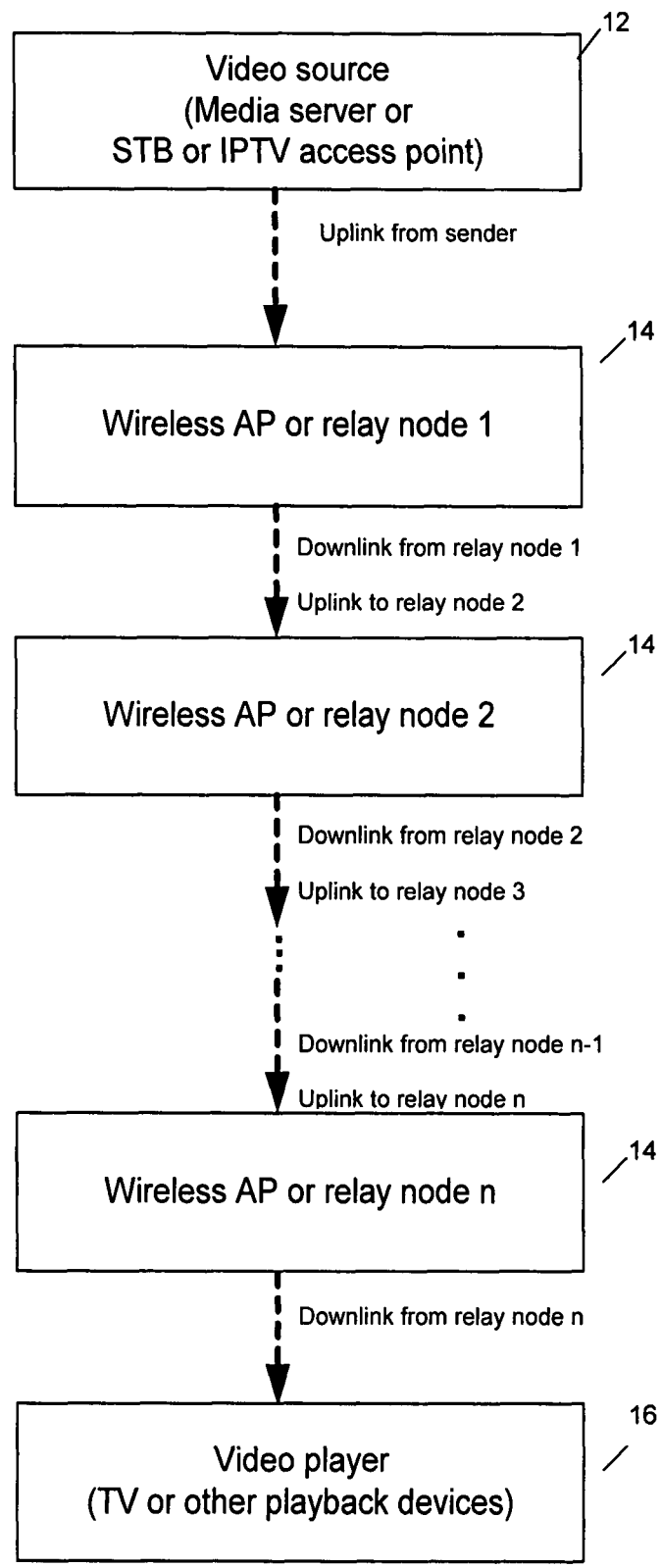
FIG. 2 shows a network implementing a wireless video streaming process, according to an embodiment of the present invention.

FIG. 2 shows a video streaming application in a wireless network 11 that implements channel selection for uplink and downlink packet transmissions, according to an embodiment of the present invention. The network 11 comprises multiple wireless communication components including a wireless video streaming source (sender) 12, n relay nodes 14 (i.e., relay node 1, relay node 2, ..., relay node n), and a wireless video stream sink (receiver) 16. The video streaming source 12 can be, e.g., a home media center PC, a TV cable set-box, an IP-TV access server or other devices. Each relay node 14 comprises a wireless AP implementing the alternate channel selection scheme, according to the present invention. The video streaming sink 16 can be, e.g., a TV, a PC or other playback device. Video streams are transmitted from the source 12 on a wireless medium through one or more relay nodes (hops) 14, and are finally received by the sink 16. At each relay node 14, two different channels are selected, one channel for uplink transmission to that communication relay, and another channel for downlink transmissions from that communication relay.

Figure 3:
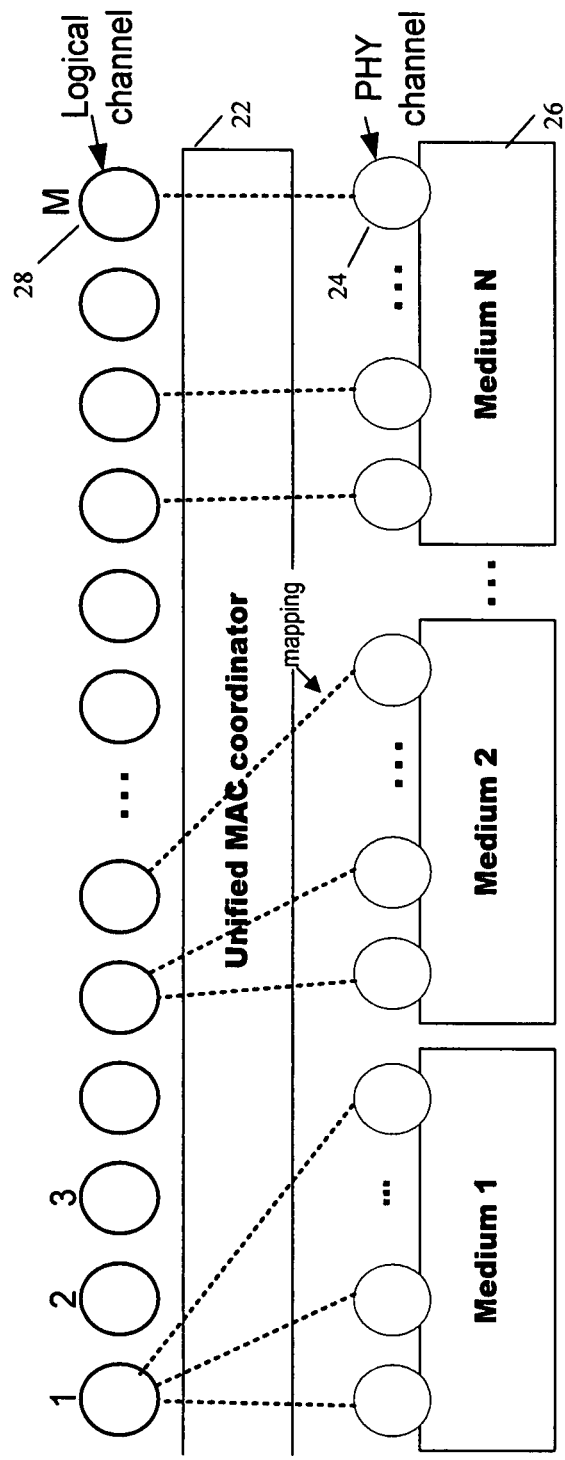
FIG. 3 shows a functional block diagram for a communication component, according to the present invention.

FIG. 3 shows example architecture for a communication component 20 according to the present invention, which is implemented in a relay node. The communication component 20 can support multiple carriers or multiple channels. A unified MAC coordinator 22 is implemented which makes medium-dependent MAC/PHY functions transparent to upper layers. The unified MAC coordinator 22 can map PHY channels 24 for N communication mediums 26 (i.e., Medium 1, Medium 2, ..., Medium N) to M logical channels 28 (i.e., logical channels 1, 2, ..., M), which are visible to upper layers. The unified MAC coordinator 22 can also convert different MAC formats and provide a common buffer space for all channels. One PHY channel can be mapped to one logical channel. Further, one or more PHY channels can be mapped to one logical channel.

Figure 4:
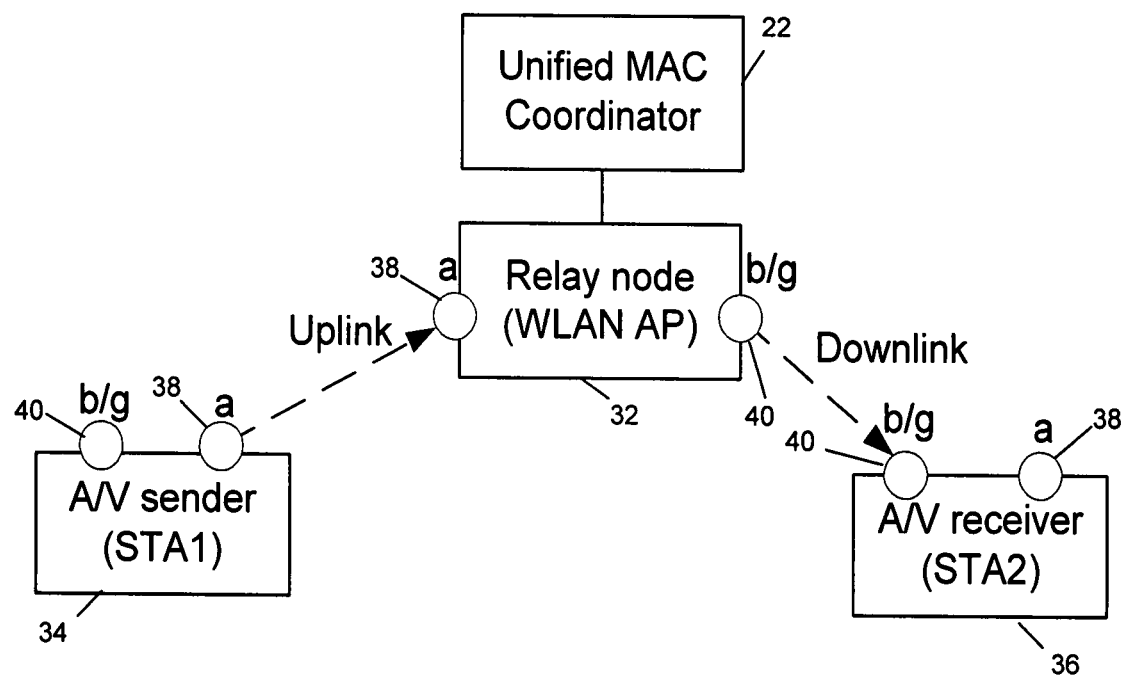
FIG. 4 shows a network of the IEEE 802.11a/b/g devices with alternate channel selection for uplink and downlink transmission, according to the present invention.

FIG. 4 shows an example wireless network 30 including a wireless relay node 32 that relays transmissions from a wireless sender 34 to a wireless receiver 36. The relay node 32 performs an alternate channel selection scheme according to the present invention. The relay node 32 comprises a wireless AP that implements the unified MAC coordinator 22, and provides IEEE 802.11a/b/g wireless communication. The relay node 32 can support at least two logical channels since IEEE 802.11a and IEEE 802.11b/g are at different frequency spectrums and usually two separate radio frequency (RF) modules (i.e., a RF module 38 for IEEE 802.11a communication and a RF module 40 for IEEE 802.11b/g communication) are utilized in the same wireless AP. The sender 34 can also include a RF module 38 for IEEE 802.11a communication and a RF module 40 for IEEE 802.11b/g communication. Similarly, the receiver 36 can also include a RF module 38 for IEEE 802.11a communication and a RF module 40 for IEEE 802.11b/g communication.

Using the functionality of the unified MAC coordinator 22, the relay node 32 implements multi-channel communication for uplink and downlink transmissions by selecting different (i.e., alternate) channels for uplink transmission (e.g., IEEE 802.11a) from the sender 34 to the relay node 32 and downlink transmission (e.g., IEEE 802.11b/g) from the relay node 32 to the receiver 36, for the same application provided that different channels are available to the relay node 32 for uplink and downlink communication, as described further below.

Figure 5:
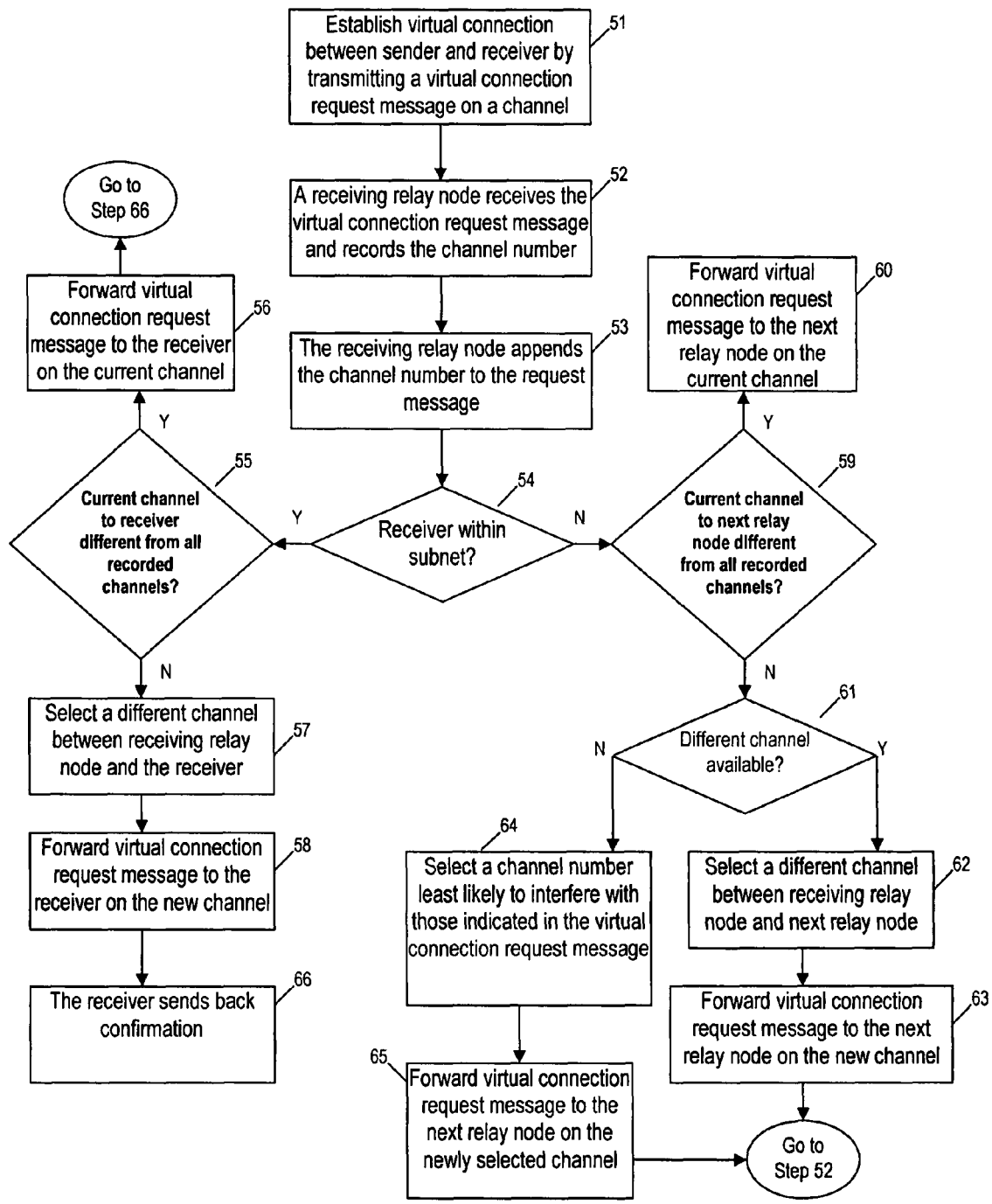
FIG. 5 shows a flowchart of the steps of a channel selection process, according to an embodiment of the present invention.

FIG. 5 shows an example process 50 for alternate channel selection at relay nodes where there are plural relay nodes between a sender and a receiver (e.g., FIG. 2). Before the start of transmission for high-rate periodical data streams such as HDTV video streams, a virtual connection is established between the sender and receiver through one or multiple relay nodes, by the sender transmitting a virtual connection setup control message uplink on a channel (step 51). The control message indicates an address of the receiver. A receiving relay node to which the sender (or a previous relay node) has been associated, receives the request and records the channel number used between the sender (or the previous relay node) and the receiving relay node (step 52). Association means that the devices are connected to each other through routing algorithms, i.e., the relay node is already decided to be the next hop to forward packets from the sender or a previous relay node.

The receiving relay node appends the channel number to the request message (step 53) and then checks whether the receiver is within the same subnet as the receiving relay node (step 54). All devices within one subnet can hear (communicate with) each other. If the receiver is within the same subnet, then the receiving relay node checks if the current channel number between the receiving relay node and the receiver is different from all channel numbers recorded in the request message (step 55). If different channels, the receiving relay node then forwards the virtual connect request message downlink to the receiver on the current channel (step 56). At this point a virtual connection link path (communication path) via one or more relay nodes is established and the process then proceeds to step 66. Otherwise, the receiving relay node selects a different channel between the receiving relay node and the receiver (step 57), and then forwards the setup request downlink to the receiver on the new channel (step 58). At this point a virtual connection link path is established, and the process then proceeds to step 66.

If in step 54, the receiving relay node finds that the receiver is not in the same subnet, then the receiving relay node checks if the current channel between the receiving relay node and a next relay node is different from all channel numbers recorded in the request message (step 59). If different channels, then the receiving relay node forwards the virtual connection request message downlink to the next relay node (step 60). Otherwise, the receiving relay node determines if a different channel for communication between the receiving relay node and the next relay node, different from all the channels recorded in the request message, is available for selection (step 61). If a different channel is available, then the receiving relay node selects a different channel between the receiving relay node and the next relay node (step 62), and then forwards the virtual connection request message downlink to the next relay node using the new channel (step 63). The process then proceeds back to step 52 where the next relay node receives the forwarded virtual connection request message uplink and takes the role of a receiving relay node.

If in step 61 the receiving relay node cannot find a new channel different from all those recorded in the request message, then the receiving relay node selects a channel number with less/minimal possibility of interference with those channels recorded in the virtual connect request message (e.g., a channel that is least frequently used and/or appeared earliest in the virtual connection request message) (step 64). Then, the receiving relay node forwards the virtual connection request message to the next relay node uplink using the newly selected channel (step 65). The process then proceeds back to step 52 where the next relay node receives the forwarded virtual connection request message uplink and takes the role of a receiving relay node.

In step 66, upon receiving the virtual connection request message, the receiver sends back a control message confirming a virtual connection confirmation to the sender. Control messages are sent back on the same channel as a forward channel since it is a bi-directional channel. After the sender receives the virtual connection confirmation, the sender starts transmitting data to the receiver using the established virtual connection link path. The virtual link path is a set of connections from the sender to the receiver via a chain of one or more relay nodes, wherein each relay node selects a downlink channel that is different from the uplink channel to that relay node. Preferably, each relay node selects a downlink channel that is different from the downlink channels selected by prior relay nodes, provided such a different downlink channel is available.

Figure 6:
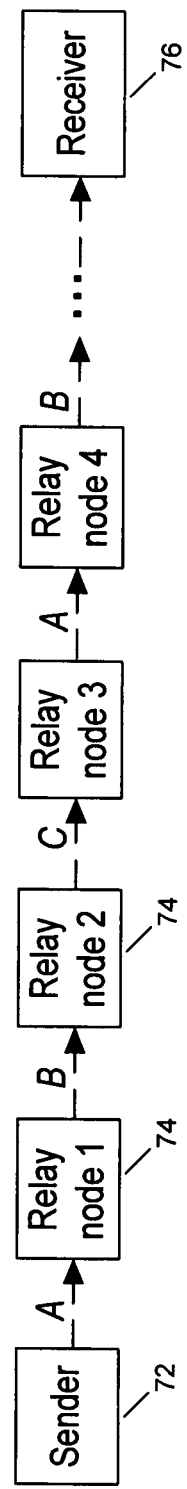
FIG. 6 shows a network of wireless devices with alternate channel selection for uplink and downlink transmission, according to the present invention.

FIG. 6 illustrates an example application of the channel selection process 50 of FIG. 5 in a network 70 including a sender 72, multiple relay nodes 74 (i.e., Relay node 1, Relay node 2, Relay node 3, Relay node 4, etc.), and a receiver 76, wherein three different communication channels (A, B and C) are available. The sender transmits data to Relay node 1 on channel A, as selected by the Relay node 1. Relay node 1 then selects channel B for downlink transmission to Relay node 2. Relay node 2 selects channel C (i.e., different from channels A and B) for its downlink transmission to Relay node 3 to avoid performance degradation caused by uplink and downlink contention and also a hidden node (i.e., the sender is hidden to the Relay node 2). Relay node 3 selects channel A again for downlink transmission to Relay node 4 since there is no unused channel among the three different channels. Since Relay node 3 is two-hops away from the sender, usually the re-use of channel A between the sender and Relay node 1 will not interfere with the use of channel A between Relay node 3 and Relay node 4. Each "hop" involves one downlink transmission between from one relay node (e.g., Relay node 1) to a next relay node (e.g., Relay node 2).

Using an alternate wireless channel selection for uplink and downlink real-time data communication according to the present invention improves channel bandwidth allocation efficiency, and reduces packet loss and end-to-end delay/jitter are reduced. Further, performance degradation due to hidden nodes is reduced. The present invention also allows real-time support for data communication with contention-based channel access control such as in A/V applications over 2.4 GHz or 5 GHz Wireless Local Area Networks (WLANs). The present invention is also useful with Wireless HD (WiHD) applications. Wireless HD is an industry-led effort to define a wireless digital network interface specification for wireless HD digital signal transmission on the 60 GHz frequency band, e.g., for consumer electronics (CE) and other electronic products. An example WiHD network (e.g., implemented in FIGS. 1-4) utilizes a 60 GHz-band mmWave technology to support a physical (PHY) layer data transmission rate of multi-Gbps (gigabits per second), and can be used for transmitting uncompressed high definition television (HDTV) signals wirelessly. The present invention is also useful for a mixed network case wherein both WLAN channels (e.g., 2.4 GHz, 5 GHz) and 60 GHz connections co-exist.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication of data via a wireless relay node in a network including one or more relay nodes, comprising:
    establishing a communication path via the relay node for communication of the data to the relay node and from the relay node;
    mapping physical layer (PHY) communication mediums to wireless channels;
    performing multi-channel communication including:
        selecting one of said wireless channels as an uplink channel for uplink transmission of the data to the relay node; and
        selecting an alternate one of said wireless channels as a downlink channel for downlink transmission of the data from the relay node, and checking for an available channel that is alternate from downlink channels selected for previous relay nodes in the communication path, wherein the communication path comprises a virtual link path including one or more relay node connections from a sender to a receiver, wherein each relay node selects a downlink channel that is alternate to an uplink channel for transmission of the data to that relay node, and if an alternate channel is unavailable, then selecting a channel as the downlink channel which is least likely to interfere with downlink channels selected for previous relay nodes in the communication path, wherein each relay node receives a current channel number used between the sender or prior relay node in a request from the sender or prior relay node and selects an available downlink channel different from downlink channels selected by the sender or prior relay nodes for all relay nodes in the virtual link path based on comparing the current channel number to channel numbers previously recorded in the request.

2. The method of claim 1 wherein:
establishing a communication path further includes establishing a communication path via multiple relay nodes for transmission of the data via the relay nodes;
for each relay node in the communication path, selecting a downlink channel for downlink transmission of the data from that relay node comprises selecting a channel as a downlink channel that is alternate to an uplink channel for transmission of the data to that relay node.

3. The method of claim 2 wherein for each relay node in the communication path selecting a downlink channel further comprises selecting a different downlink channel from downlink channels selected for other relay nodes in the communication path, wherein uplink and downlink real-time data communication is performed.

4. The method of claim 2 wherein for each relay node in the communication path, selecting a downlink channel further comprises selecting a downlink channel alternate from downlink channels selected for the previous relay nodes in the communication path.

5. The method of claim 2 wherein for each relay node in the communication path, selecting a downlink channel further comprises:
if an alternate channel is available, then selecting the available alternate channel as the downlink channel for downlink transmission of the data from that relay node.

6. The method of claim 5 wherein for each relay node in the communication path, selecting a downlink channel further comprises:
if an alternate channel is unavailable, then selecting a channel as the downlink channel which is least frequently used with downlink channels selected for the previous relay nodes in the communication path.

7. The method of claim 2 wherein establishing a communication path further includes:
at each relay node, determining if the receiver is within the same subnet as the relay node; and
if the receiver is within the same subnet as the relay node, then establishing a connection with the receiver.

8. The method of claim 7, wherein establishing the communication path further includes:
if the receiver is not with the same subnet as the relay node, then establishing a connection with a next relay node.

9. The method of claim 2 further comprising transmitting the data from the sender to the receiver via the communication path.

10. The method of claim 1 wherein selecting a channel as the downlink channel which is least likely to interfere with downlink channels selected for the previous relay nodes in the communication path further includes selecting a channel that is least frequently used and/or selected earliest as a downlink channel in the communication path.

11. The method of claim 1 wherein the data includes audio/video information.

12. The method of claim 11 wherein the audio/video data includes streaming video information.

13. The method of claim 11 wherein the audio/video information includes high definition video information.

14. The method of claim 13 wherein the audio/video information includes uncompressed high definition video information.

15. The method of claim 1 wherein one or more of the uplink channel and the downlink channel comprises a 2.4 GHz, a 5 GHz, or a 60 GHz frequency band channel for transmission of digital video information.

16. The method of claim 1, wherein:
mapping PHY communication mediums to wireless channels further comprises, in a media access control (MAC) layer, mapping N PHY communication mediums to M logical wireless channels for multi-channel communication;
selecting a wireless channel as an uplink channel further comprises selecting one of said logical wireless channels as an uplink channel for uplink transmission of the data to the relay node; and
selecting an alternate wireless channel as a downlink channel comprises selecting an alternate one of said logical wireless channels as a downlink channel for downlink transmission of the data from the relay node.

17. The method of claim 16, wherein a unified MAC coordinator is configured for mapping the N PHY communication mediums to M logical wireless channels.

18. The method of claim 17, wherein the unified MAC coordinator is configured for converting different MAC formats and providing a common buffer space for all PHY communication mediums and logical wireless channels.

19. The method of claim 1, wherein the wireless channels comprise wireless channels visible to upper layers.

20. The method of claim 1, wherein the virtual link path comprises a plurality of relay node connections from a sender to a receiver, wherein each relay node selects a downlink channel different from an uplink channel to the respective relay node.

21. The method of claim 1, wherein the virtual link path comprises a set of relay node connections from a sender to a receiver, wherein each relay node in the virtual link path selects a downlink channel different from an uplink channel to the respective relay node.

22. The method of claim 1, further comprising each node in the virtual link path selecting different and independent wireless channels for uplink and downlink transmission for a real-time audio/video streaming data transmission application.

23. The method of claim 1, wherein each relay node records the received current channel number used between the sender or prior relay node.

24. The method of claim 1, wherein a relay node that receives the request from the sender or prior relay node appends the current channel number to the request.

25. A method of wireless data communication in a network for transmitting data via one or more relay nodes, comprising:
mapping physical layer (PHY) communication mediums to wireless channels;
performing multi-channel communication including:
selecting one of said wireless channels as an uplink channel for transmission of data to a current relay node; and
selecting an alternate one of said wireless channels as a downlink channel for transmission of the data from the relay node to either a receiver if the receiver is within the same subnet as the current relay node, or to a next relay node if the receiver is not within the same subnet as the current relay node, wherein a communication path via the relay node for communication of the data to the relay node and from the relay node comprises a virtual link path including one or more relay node connections from a sender to a receiver, and checking for an available channel that is alternate from downlink channels selected for previous relay nodes in the communication path, and if an alternate channel is unavailable, then selecting a channel as the downlink channel which is least likely to interfere with downlink channels selected for previous relay nodes in the communication path, wherein each relay node selects a downlink channel that is alternate to an uplink channel for transmission of the data to that relay node, wherein each relay node receives a current channel number used between the sender or prior relay node in a request from the sender or prior relay node and selects an available downlink channel different from downlink channels selected by the sender or prior relay nodes for all relay nodes in the virtual link path based on comparing the current channel number to channel numbers previously recorded in the request.

26. The method of claim 25 wherein each relay node comprises a wireless access point in a wireless local area network (WLAN).

27. The method of claim 26 wherein the sender and the receiver comprise wireless stations in a WLAN.

28. The method of claim 25 wherein the network comprises a 60 GHz frequency network for wireless transmission of digital video information for supporting physical (PHY) layer data transmission rate of multi-gigabits per second.

29. A wireless relay node for transmitting data in a wireless network, comprising:
a communication module configured for receiving uplink transmissions to the relay node and for transmitting downlink transmissions from the relay node; and
a coordinator configured for mapping physical layer (PHY) communication mediums to wireless channels, and performing multi-channel communication including: selecting one of said wireless channels as an uplink channel for uplink transmission of data to the relay node, checking for an available channel that is alternate from downlink channels selected for previous relay nodes in the communication path, and selecting an alternate one of said wireless channels as a downlink channel for downlink transmission of the data from the relay node, wherein a communication path via the relay node for communication of the data to the relay node and from the relay node comprises a virtual link path including one or more relay node connections from a sender to a receiver, and if an alternate channel is unavailable, then the coordinator selects a channel as the downlink channel which is least likely to interfere with downlink channels selected for previous relay nodes in the communication path,
wherein each relay node selects a downlink channel that is alternate to an uplink channel for transmission of the data to that relay node,
wherein each relay node receives a current channel number used between the sender or prior relay node in a request from the sender or prior relay node and selects an available downlink channel different from downlink channels selected by the sender or prior relay nodes for all relay nodes in the virtual link path based on comparing the current channel number to channel numbers previously recorded in the request.

30. The relay node of claim 29 wherein:
the communication module is further configured for receiving data transmitted by a sender or another relay node via an uplink channel; and
the coordinator is further configured for selecting an alternate channel as a downlink channel for transmission of the data from the relay node to either a receiver if the receiver is within the same subnet as the current relay node, or to a next relay node if the receiver is not within the same subnet as the current relay node.

31. The relay node of claim 30 wherein the coordinator is further configured for selecting a downlink channel different from downlink channels selected for other relay nodes in a communication path between the sender and the receiver, wherein uplink and downlink real-time data communication is performed.

32. The relay node of claim 30 wherein the coordinator is further configured for selecting a downlink channel alternate from downlink channels selected for previous relay nodes in the communication path.

33. The relay node of claim 30 wherein if an alternate channel is available, then the coordinator selects the available alternate channel as the downlink channel for downlink transmission from that relay node.

34. The relay node of claim 33 wherein the coordinator is further configured such that if an alternate channel is unavailable, then the coordinator selects a channel as the downlink channel which is least frequently used with downlink channels selected for the previous relay nodes in the communication path.

35. The relay node of claim 29 wherein the coordinator is further configured selecting a channel as the downlink channel which is least likely to interfere with downlink channels selected for the previous relay nodes in the communication path by selecting a channel that is least frequently used and/or selected earliest as a downlink channel in the communication path.

36. The relay node of claim 29 wherein the data includes audio/video information.

37. The relay node of claim 36 wherein the audio/video data includes streaming video information.

38. The relay node of claim 36 wherein the audio/video information includes high definition video information.

39. The relay node of claim 38 wherein the audio/video information includes uncompressed high definition video information.

40. The relay node of claim 29 wherein one or more of the uplink channel and the downlink channel comprises a 2.4 GHz, 5 GHz, or 60 GHz frequency band channel for transmission of digital video information.

41. The relay node of claim 40 wherein two or more of 2.4 GHz, 5 GHz and 60 GHz frequency band channels co-exist in the wireless network for transmission of information.

42. The relay node of claim 29, wherein the coordinator comprises a unified media access control (MAC) coordinator.

43. The relay node of claim 42, using the unified MAC coordinator, the relay node implements multi-channel communication for uplink and downlink transmissions by selecting alternate channels for uplink transmission from a sender to the relay node and downlink transmission from the relay node to a receiver.

44. The relay node of claim 43, wherein a virtual connection is established between the sender and the receiver through one or more relay nodes, wherein the sender transmits a virtual connection setup control message uplink on a channel indicating an address of the receiver.

45. The method of claim 44, wherein a receiving relay node to which a sender is associated receives the virtual connection setup control message uplink on the channel and records a channel number for the channel used between the sender and the receiving relay node, wherein the sender is associated with the receiving relay node based on connection through a routing algorithm.

46. A wireless communication system comprising:
a wireless sender, a wireless receiver, and a wireless relay node for relaying data transmissions between the sender and the receiver;
the wireless relay node comprising:
- a communication module configured for receiving uplink transmissions to the relay node and for transmitting downlink transmissions from the relay node; and
- a coordinator configured for mapping physical layer (PHY) communication mediums wireless channels, and performing multi-channel communication including: selecting one of said wireless channels as an uplink channel for uplink transmission of data to the relay node, and selecting an alternate one of said channels as a downlink channel for downlink transmission of the data from the relay node, wherein a communication path via the relay node for communication of the data to the relay node and from the relay node comprises a virtual link path including one or more relay node connections from a sender to a receiver, wherein the coordinator checks for an available channel that is alternate from downlink channels selected for previous relay nodes in the communication path, and if an alternate channel is unavailable, then the coordinator selects a channel as the downlink channel which is least likely to interfere with downlink channels selected for previous relay nodes in the communication path, wherein each relay node selects a downlink channel that is alternate to an uplink channel for transmission of the data to that relay node, wherein each relay node receives a current channel number used between the sender or prior relay node in a request from the sender or prior relay node and selects an available downlink channel different from downlink channels selected by the sender or prior relay nodes for all relay nodes in the virtual link path based on comparing the current channel number to channel numbers previously recorded in the request.

47. The system of claim 46 wherein:
the communication module is further configured for receiving data transmitted by a sender or another relay node via an uplink channel; and
the coordinator is further configured for selecting an alternate channel as a downlink channel for transmission of the data from the relay node to either a receiver if the receiver is within the same subnet as the current relay node, or to a next relay node if the receiver is not within the same subnet as the current relay node.

48. The system of claim 47 wherein the coordinator is further configured for selecting a downlink channel alternate from downlink channels selected for other relay nodes in a communication path between the sender and the receiver.

49. The system of claim 47 wherein the coordinator is further configured for selecting a downlink channel different from downlink channels selected for previous relay nodes in the communication path, wherein uplink and downlink real-time data communication is performed.

50. The system of claim 47 wherein if an alternate channel is available, then the coordinator selects the available alternate channel as the downlink channel for downlink transmission from that relay node.

51. The system of claim 50 wherein the coordinator is further configured for selecting a channel as the downlink channel which is least likely to interfere with downlink channels selected for the previous relay nodes in the communication path by selecting a channel that is least frequently used and/or selected earliest as a downlink channel in the communication path.

* * * * *